United States Patent [19]

Müller

[11] Patent Number: 5,076,931
[45] Date of Patent: Dec. 31, 1991

[54] MICROFILTRATION PROCESS AND APPARATUS

[76] Inventor: Wolfgang Müller, Winterfeldstrasse 18, D-4600 Dortmund 1, Fed. Rep. of Germany

[21] Appl. No.: 605,832

[22] Filed: Oct. 30, 1990

[30] Foreign Application Priority Data

Nov. 4, 1989 [DE] Fed. Rep. of Germany ....... 3936798

[51] Int. Cl.⁵ ............................................. B01D 61/22
[52] U.S. Cl. .................................. 210/637; 210/321.65
[58] Field of Search ..................... 210/637, 321.65, 739

[56] References Cited

U.S. PATENT DOCUMENTS 4,911,847 3/1990 Shmidt et al. ...................... 210/739

Primary Examiner—Frank Sever
Attorney, Agent, or Firm—Herbert Dubno

[57] ABSTRACT

The microfiltration of a turbid liquid, especially the microfiltration of a fermentation liquid to recover beer from a suspension containing excess yeast is controlled by measuring a flow velocity (v) and a pressure drop ($\Delta p$) and calculating from the flow velocity (v) and the pressure drop ($\Delta p$) by an apparatus-characteristic function F (v, $\Delta p$) containing the flow velocity (v) and pressure drop ($\Delta p$) as variables a value of concentration of the turbidity-producing solids in the retentate stream. The value of the concentration as thus determined forms an actual value which is compared with a setpoint value of the concentration to determine a difference which is used to control the rate at which the concentrate stream is withdrawn from the retentate stream.

7 Claims, 1 Drawing Sheet

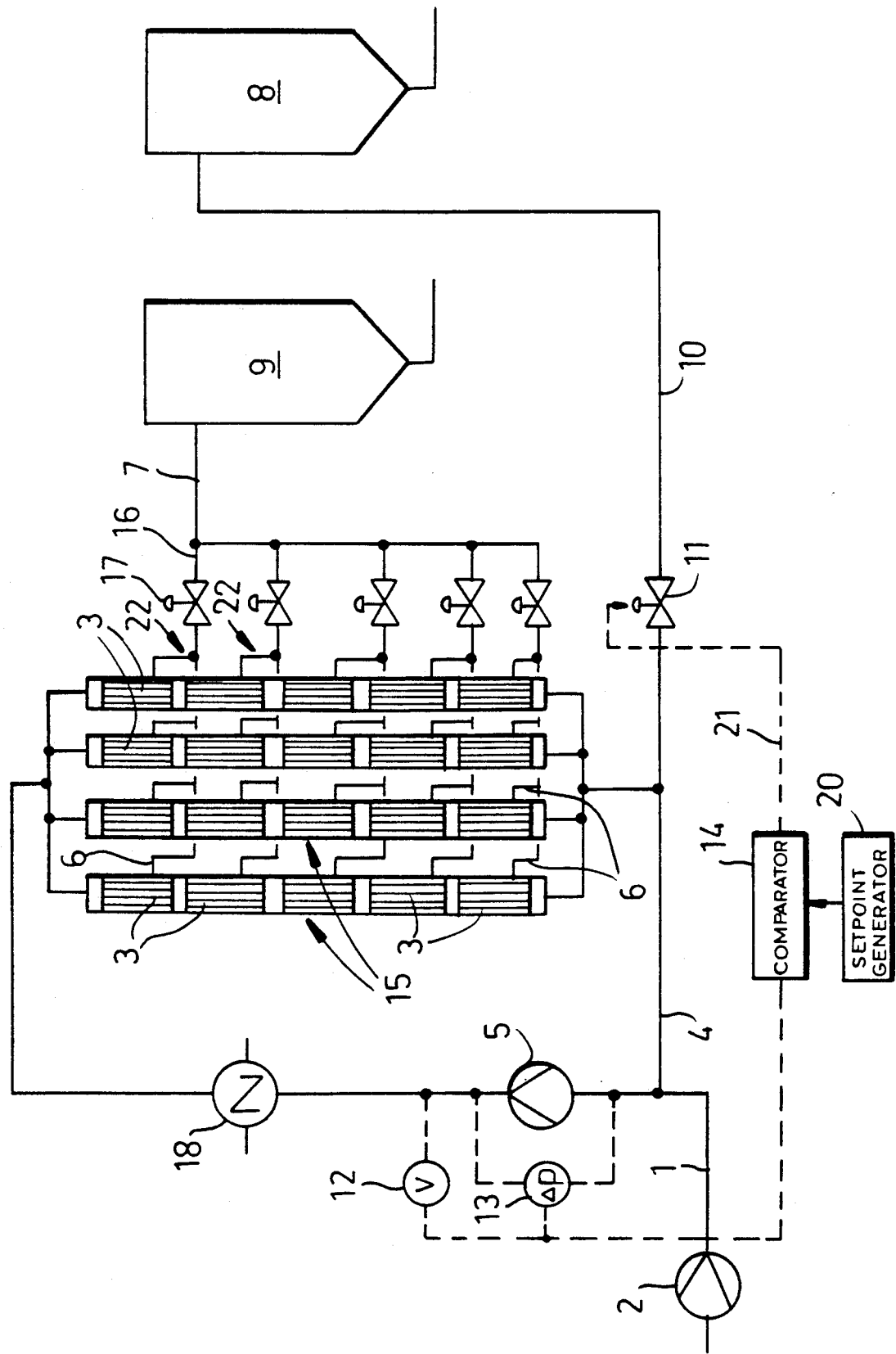

MICROFILTRATION PROCESS AND APPARATUS

FIELD OF THE INVENTION

My present invention relates to a microfiltration process and apparatus and, more particularly, to the microfiltration of a turbid liquid, especially beer which can be recovered by such filtration from the yeast-containing liquid of a fermentation process. The invention, therefore, is also applicable to the filtration of turbid liquids obtained by other types of fermentation.

BACKGROUND OF THE INVENTION

From Brauwelt, Vol. 4, pages 118-125 (1987) and Filtration and Separation, pages 198-200 (1989), it is known for the recovery of beer from the liquid product obtained by the fermentation and which may contain surplus yeast, to carry out a filtration of the turbid liquid under pressure through at least one microfiltration module utilizing the tangential mode of filtration.

In the tangential filtration mode, the suspension to be filtered is passed across the porous filtration surface in a substantially continuous flow and under pressure so that some of the liquid will traverse the filtration membrane and can be collected on the opposite side thereof as a filtrate or permeate. The balance of the liquid and the solids of the suspension which cannot pass through the microporous membrane, continue along the surfaces of the filtration module as a retentate.

The process operates substantially continuously with recirculation of the retentate stream to the microfiltration module. The suspension to be filtered is fed continuously to the retentate stream upstream of the module and a concentrate stream with a substantially constant turbidity or suspended-solids concentration is continuously withdrawn from the retentate stream downstream of the module. When the process is used for the recovery of beer from the turbid liquid containing the surplus yeast, the yeast constitutes the turbidity and the clear or bright recovered liquid is the beer.

In the earlier systems described, tube bundle modules are generally employed and are traversed by the suspension to be filtered in turbulent flow. The filter tubes are constituted by tubular microporous ceramic membranes. The microfiltration unit can be equipped with a heat exchanger for cooling the retentate stream. The filtrate pipes for the microfiltration unit can be matched thereto by providing a plurality of microfiltration modules in cascade or series in each of a plurality of parallel segments with the filtrate pipes being connected to the modules of these segments (see German Patent Document DE-OS 37 00 804).

In the process described in which the suspension to be filtered is continuously fed to the circulated retentate stream and a concentrate stream is continuously withdrawn, it is problematical to continuously or repeatedly measure the turbidity concentration in the retentate stream for controlling the process. In general, turbidity measurements and specific gravity measurements must be constantly taken by measuring processes which are complex, expensive and prone to error, i.e. are not reliable.

OBJECTS OF THE INVENTION

It is, therefore, the principal object of the invention to provide a process which can reliably produce a filtrate having a substantially constant and predetermined specific gravity and which can be carried out automatically with improved control.

Another object of this invention is to provide a filtration process which will afford a high quality clear fermented liquid, especially beer with reduced possibilities of failure.

Another object of the invention is to provide a method of filtering beer or other fermentation liquids whereby control problems which may develop in earlier systems can be avoided.

Yet another object of my invention is to provide an improved apparatus for the filtration of fermentation liquids whereby drawbacks of earlier systems are avoided.

SUMMARY OF THE INVENTION

These objects and others which will become apparent hereinafter are attained, in accordance with the invention by a process for the microfiltration of a turbid liquid, i.e. a fermentation liquid where the turbidity is yeast, e.g. to yield a high brightness beer, which comprises the steps of:

(a) passing a suspension of turbidity-producing solids in the liquid across a porous membrane of a microfiltration module under pressure, thereby filtering the liquid by tangential filtration to produce a filtrate traversing the membrane and a retentate;

(b) recirculating retentate from the module along a circulation path back to the module to form a circulating retentate stream;

(c) continuously feeding the turbid liquid to be filtered to the retentate stream at a location upstream of the module;

(d) continuously withdrawing a concentrate stream having a substantially constant concentration of the turbidity-producing solids from the retentate stream downstream of the module;

(e) measuring a flow velocity (v) and a pressure drop ($\Delta p$) and calculating from the flow velocity (v) and the pressure drop ($\Delta p$) by an apparatus-characteristic function F (v, $\Delta p$) containing the flow velocity (v) and pressure drop ($\Delta p$) as variables, a value of concentration of the turbidity-producing solids in the retentate stream;

(f) comparing the value of the concentration of the turbidity-producing solids in the retentate stream as an actual value with a setpoint value of the concentration in an actual value/setpoint value comparison to determine a difference of the values; and (g) controlling a rate at which the concentrate stream is withdrawn from the retentate stream in step (d) in response to the difference as determined by the actual value/setpoint value comparison.

The apparatus-characteristic function F (v, $\Delta p$) can be determined relatively easily. For example, the pressure drop losses for a variety of velocities can be determined at constant turbidity or turbid-producing solids concentrations and the pressure drop can then be plotted as a function of velocity to yield a function of the form $$\Delta p \, v^n$$

in most cases a similar function can be derived from standard flow analysis. For turbulent flow in pipes, the following formula has been found to be commonly usable $$\Delta p \, v^{7/4}.$$

In a second set of experiment, the suspended solids concentration w in relevant concentration ranges can be varied and the pressure drop measurements carried out. The result is a relationship of the form $$w = F \frac{\Delta p}{v^n}$$

so that the apparatus-characteristic function F is immediately determined and can be approximated by an exponential equation.

The use of the apparatus-characteristic function, however, requires that the concentration-dependent viscosity change be negligibly small by comparison to the specific gravity change or density change with suspended solids concentration. This is, of course, the case with turbulent flow of the retentate stream thus a turbulent flow of the retentate stream of the microfiltration module is the preferred flow mode of the present invention.

The method of the invention can make use of microfiltration modules in the form of plate modules or other module types to be traversed by the circulated retentate. Preferably, however, tube bundle modules are used, each comprising a multiplicity of parallel membrane tubes traversed in parallel by the circulated retentate.

When a tube bundle module is used, it is advantageous to have the retentate stream pass through that module with turbulent flow. In the membrane tubes, for this purpose, a Reynolds Number of 8,000 to 30,000 is maintained preferably between 10,000 and 20,000.

According to another feature of the invention, the volume rate of flow of filtrate from the module or the pressure of the filtrate in the filtrate pipe is controlled to remain at a setpoint value which takes the steady state operation of the filter.

With controlled filtrate removal, it is possible to ensure an unusually uniform cover layer on the membrane surface which, in turn, ensures uniform filtration. It will be apparent that this is especially significant when, after a cleaning of the apparatus, a new operating state is established. The cover layer, of course, is a layer of the deposited solids.

It has been found, moreover, to be advantageous to maintain the retentate at a constant temperature. In the separation of beer from excess yeast in the turbid suspension, a high filtration rate with good separation results will be obtained when the constant temperature is in the range of 18° to 22° C.

The invention also comprises an apparatus for carrying out the method of the invention. That apparatus can comprise:

a microfiltration module having a porous membrane;

means for passing a suspension of turbidity-producing solids in the liquid across the porous membrane of the microfiltration module under pressure, thereby filtering the liquid by tangential filtration to produce a filtrate traversing the membrane and a retentate;

means for recirculating retentate from the module along a circulation path back to the module to form a circulating retentate stream;

means for continuously feeding the turbid liquid to be filtered to the retentate stream at a location upstream of the module;

means for continuously withdrawing a concentrate stream having a substantially constant concentration of the turbidity-producing solids from the retentate stream downstream of the module;

means for measuring a flow velocity (v) and a pressure drop ($\Delta p$) and calculating from the flow velocity (v) and the pressure drop ($\Delta p$) by an apparatus-characteristic function F (v, $\Delta p$) containing the flow velocity (v) and pressure drop ($\Delta p$) as variables a value of concentration of the turbidity-producing solids in the retentate stream;

means for comparing the value of the concentration of the turbidity-producing solids in the retentate stream as an actual value with a setpoint value of the concentration in an actual value/setpoint value comparison to determine a difference of the values; and means for controlling a rate at which the concentrate stream is withdrawn from the retentate stream in response to the difference as determined by the actual value/setpoint value comparison.

In particular the means for recirculating comprises a circulating pipe and a circulating pump connected in the pipe, the means for withdrawing comprises a concentrate pipe provided with a concentrate control valve, the means for feeding comprises a feed pipe communicating with the circulating pipe upstream of the recirculating pump and a feed pump connected to the feed pipe, and the module is provided with a filtrate pipe for removing the filtrate from the module, the means for measuring includes respective measuring devices connected to the circulating pipe for measuring the flow velocity (v) and the pressure drop ($\Delta p$), and the means for comparing includes a comparator outputting control pulses representing the difference and applying the control pulses to the valve.

Preferably, the filtrate pipe is provided with a filtrate control valve allowing the filtrate outflow to be set to the setpoint value characterizing the steady state as described.

It has been found to be advantageous, moreover, to utilize a multiplicity of microfiltration modules disposed in cascade, i.e. in series, and each series connection of the modules in parallel with others. This allows the filtration modules to meet the need for filtrate output.

In many cases it is sufficient to provide a filtrate control valve in only one of the filtrate pipes and to connect a plurality of filtrate pipes in a manifold arrangement to the filtrate pipe provided with the control valve.

In a preferred embodiment of the invention, a plurality of parallel separation columns are provided and each column has a plurality of tube-bundle modules connected in series or cascade. In that embodiment, respective manifolds are connected to the corresponding modules of all of the columns and lead to respective filtrate pipes so that filtrate pipe provided with a control valve is utilized for each manifold. This allows compensation for local differences in filtrate flow based upon different transmembrane pressure differences.

In apparatus respects as well it is preferred to provide in the circulating pipe a heat exchanger for the purposes described.

The advantage of the invention is that the microfiltration process for the recovery of beer from the suspension resulting from the fermentation process and for concentration of the excess yeast can be effected in a highly compact apparatus. A large-volume circulating vessel, related tanks and the like for the intervening storage of the suspension to be processed are not required. This greatly simplifies the integration of the process into existing breweries. Another advantage is that, because of the steady state operation, a uniform cover layer is built up on the membrane surface and thus a highly uniform and constant filtrate quality can be ensured. The setting of a predetermined viscosity or specific gravity of the retentate and of the filtrate can be reliably ensured in a simple manner. The pressure ensuring device and the measuring device for determining the flow velocity of the retentate stream can be standard pressure and flow velocity measuring instruments which may already be available in the brewery. The measuring and controlled equipment can be of low cost and highly reliable. Similar results are obtained when the process is used for the concentration of turbid suspensions or the preparation of filtrates or permeates other than beer.

BREIF DESCRIPTION OF THE DRAWING

The above and other objects, features and advantages of my invention will become more readily apparent from the following description, reference being made to the sole FIGURE of the accompanying drawing which is a flow diagram of an apparatus for carrying out the method of the invention as applied to the production of beer from a suspension deriving from a fermentation stage and in which the turbidity is caused by excess yeast.

SPECIFIC DESCRIPTION

The apparatus shown in the drawing comprises a feed pipe 1 together with a feed pump 2 for delivering the feed stacked in the form of a turbid suspension of excess yeast in beer to a circulating pipe 4 upstream of a circulating pump 5.

The circulating path comprises a multiplicity of microfiltration modules 3 which are constituted of respective pipe bundles, the pipes of which are represented at 19 in the drawing for example. These pipes comprise porous membranes, especially microporous membranes which are traversed in a tangential filtration mode.

From these modules 3 a multiplicity of filtration pipes 6 extend laterally to a common filtrate line 7.

Storage tanks 8 and 9 are provided for the concentrated surplus yeast and the filtered beer, respectively.

A concentrate pipe 10 is connected to the circulating pipe 4 downstream of the filtration modules 3 and upstream of the circulating pump 5 and the point at which the feed stock is supplied, i.e. the junction of feed pipe 1 with pipe 4.

In the circulating pipe 4 as well, there are provided measuring devices 12 and 13 for measuring the flow velocity (v) and the flow pressure drop or pressure loss ($\Delta p$).

The measuring devices 12 and 13 are connected with a control unit 14 constituting a comparator to which a setpoint value is delivered from a setpoint generator 20 so that the comparator 14 can output pulses at 21 representing a difference signal as will be described, to the concentrate control valve 11 in the concentrate pipe 10.

A multiplicity of the microfiltration modules 3 are provided in cascade, in series, one above the other in each of a plurality of parallel connected separating columns 15.

The filtrate pipes 6 of corresponding modules 3 along the path of the retentate form respective manifolds 22, each of which has its output pipe 16 provided with a respective filtrate control valve 17.

In the circulating pipe 4, moreover, a heat exchanger 18 is provided to maintain a substantially constant temperature of the retentate.

As will be apparent from the drawing, therefore, the circulating pump 5 recirculates the retentate stream enriched with the excess yeast along the pip 4 and forces the retentate stream under pressure through the microfiltration modules 3 so that the microporous ceramic membranes thereof are traversed in a tangential mode.

Because of the transmembrane pressure differential which thus results, a filtrate or permeate is separated which is free from suspended solids and is a bright beer or a yeast beer. The process is continuous. Thus the suspension obtained from a fermentation tank (not shown) and which contains the excess yeast is fed to the retentate stream via the line 1 continuously.

In addition, a concentrate stream is continuously withdrawn via the pipe 10 and the valve 11.

The flow velocity v and the flow pressure loss or drop $\Delta p$ of the retentate stream are detected by the measuring devices 12 and 13 installed in the circulating line to supply the values of the flow velocity and the pressure drop to the comparator 14. For measuring the pressure drop $\Delta p$, pressures are measured preferably upstream and downstream of the pump and immediately adjoining the latter. From the measurement data, the turbidity producing suspended solids concentration of the retentate stream is calculated from the apparatus-characteristic function F (v, $\Delta p$) which contains the flow velocity v and the pressure drop $\Delta p$ as variables and is compared with a setpoint value of the turbidity or suspended solids concentration.

From this actual value/setpoint value comparison the turbidity producing suspended solids concentration difference is obtained and valve 11 controlled by the resulting pulses representing that difference. When the actual value is lower than the setpoint value, valve 11 is closed and when the actual value is greater than the setpoint value valve 11 is opened.

The retentate stream traverses the membrane tubes 19 of the microfiltration modules 3 in turbulent flow. Good filtration results can be obtained with a precise maintenance of a predetermined degree of thickening when in the membrane tubes the Reynolds Number is set at 8,000 to 30,000, preferably between 10,000 and 20,000. In the case of beer it is case of beer it is preferred to maintain the retentate at a constant temperature in the range of 18° C. to 22° C. on recirculation.

According to the invention the volume rate of flow or pressure of the filtrate drawn from the microfiltration modules is also controlled as described and for this purpose, the filtrate pipes 6 of the modules 3 within the separating columns 15 are all connected at corresponding locations and for corresponding modules from the respective manifold 22 with a common filtrate collector 16 equipped with control valve 17. These valves are controlled so that the filtrate flows off at a volume rate of flow characteristic of the steady state. Filtrate control is especially important during start-up of the apparatus following a cleaning when a steady state is to be established.

SPECIFIC EXAMPLE

In an apparatus as illustrated the pipe membranes are composed of ceramic. The internal diameter of each membrane pipe is 6 millimeters. The pore diameter is 0.2 $\mu$m. Four such separating columns are connected in parallel. The retentate stream is fed with a constant pressure of 3 bar by means of the circulating pump 5 which can be a centrifugal pump. The flow velocity is dependent upon the suspended solids concentration of the retentate and a flow velocity of 1.5 m/sec is sufficient at higher suspended solids concentrations.

The suspension from teh fermentation stage generally has a suspended solids concentration of about 18-24% by weight. The retentate temperature is maintained at 20° C.

I claim:

1. A process for the microfiltration of a turbid liquid, comprising the steps of:
    (a) passing a suspension of turbidity-producing solids in said liquid across a porous membrane of a microfiltration module under pressure, thereby filtering said liquid by tangential filtration to produce a filtrate traversing said membrane and a retentate;
    (b) recirculating retentate from said module along a circulation path back to said module to form a circulating retentate stream;
    (c) continuously feeding said turbid liquid to be filtered to said retentate stream at a location upstream of said module;
    (d) continuously withdrawing a concentrate stream having a substantially constant concentration of said turbidity-producing solids from said retentate stream downstream of said module;
    (e) measuring with measuring means, a flow velocity (v) and a pressure drop ($\Delta p$) and calcualting from siad flow velocity (v) and said pressure drop ($\Delta p$) by an apparatus-characteristic function F (v, $\Delta p$) containing the flow velocity (v) and pressure drop ($\Delta p$) as variables, a value of concentration of said turbidity-producing solids in said retentate stream;
    (f) comparing with comparing means, said value of said concentration of said turbidity-producing solids in said retentate stream as an actual value with a setpoint value of said concentration in an actual value/setpoint value comparison to determine a difference of said values; and
    (g) controlling with controlling means, a rate at which said concentrate stream is withdrawn from said retentate stream in step (d) in response to said difference as determined by said actual value/setpoint value comparison.

2. The process defined in claim 1 wherein said module comprises a multiplicity of parallel membrane tubes, said retentate stream being caused to flow turbulently through said tubes in a direction parallel thereto.

3. The process defined in claim 2 wherein a Reynolds Number of substantially 8,000 to 30,000 is maintained in said membrane tubes.

4. The process defined in claim 3 wherein said Reynolds Number is 10,000 to 20,000.

5. The process defined in claim 1, further comprising the step of controlling quantity or pressure of the filtrate withdrawn from said module to maintain a setpoint value of filtrate flow therefrom characterizing a steady state operation of said module.

6. The process defined in claim 1, further comprising the step of maintaining said retentate stream at a substantailly constant temperature.

7. The process defined in claim 6 wherein said temperature is in a range of 18° to 22° C.

* * * * *